United States Patent [19]
Winter et al.

[11] 3,992,977
[45] Nov. 23, 1976

[54] PRODUCTION OF MULTIPLE GAUGE STRIP BY DRAW-SHAVING

[75] Inventors: Joseph Winter, New Haven; Eugene Shapiro, Hamden; Warren F. Smith, Branford, all of Conn.

[73] Assignee: Olin Corporation, New Haven, Conn.

[22] Filed: Dec. 19, 1975

[21] Appl. No.: 642,594

Related U.S. Application Data

[63] Continuation-in-part of Ser. No. 462,851, April 22, 1974, abandoned.

[52] U.S. Cl. ................................... 90/24 R; 90/52
[51] Int. Cl.² ............................................. B23D 1/00
[58] Field of Search .............. 90/24 R, 11.3, 34, 38, 90/52; 83/5

[56] References Cited
UNITED STATES PATENTS

| | | | |
|---|---|---|---|
| 1,928,150 | 9/1933 | Douglas | 90/34 F |
| 2,520,222 | 8/1950 | Stone | 90/11 C |
| 2,936,679 | 5/1960 | Thuerwacther | 90/24 |

*Primary Examiner*—Gil Weidenfeld
*Attorney, Agent, or Firm*—David A. Jackson; Robert H. Bachman; Robert A. Dawson

[57] ABSTRACT

A method of producing multiple gauge metal strip wherein surface reduction is confined to an area comprising from about 5 to about 50% of total surface area, and volume reduction ranges from about 10 to about 60% of initial strip cross section area, which comprises measuring the maximum stock removal in relation to the yield strength of said strip, adjusting a shaving apparatus to prevent it from exceeding said maximum and passing the strip through said apparatus. The method of this invention may be practiced as a single pass procedure.

13 Claims, 5 Drawing Figures

PRODUCTION OF MULTIPLE GAUGE STRIP BY DRAW-SHAVING

CROSS REFERENCE TO RELATED APPLICATION

The present application is a continuation-in-part of co-pending application Ser. No. 462,851, filed in Apr. 22, 1974, by the inventors herein now abandoned.

BACKGROUND OF THE INVENTION

This invention relates to a method for the preparation of multiple gauge metal strip by a shaving operation wherein the strip workpiece is drawn through the shaving apparatus.

In many applications, such as the production of copper strip for the formation of electrical connectors and the like, it is necessary to provide a multiple gauge thickness in the metal strip. Heretofore, such conventional procedures as continuous milling have been employed to produce the desired variations in gauge. Such processes suffer from the disadvantages of being time-consuming and generating an unfavorable form of scrap.

Another procedure which has been investigated in the art comprises the reduction to gauge by a rolling operation. Rolling operations in production are unfavorably restricted to certain shapes, tend to involve complex and costly tooling and are not good enough to provide products meeting commercial tolerances and that are free from structural defects.

The technique of shaving as a form of metal reduction has been known for some time, however its application has been generally limited to the finishing of materials of uniform cross section by the reduction in cross sectional area of the workpiece, with reduction conducted along the entire surface area thereof. This technique is illustrated in U.S. Pat. No. 3,055,102 to Shaw et al., wherein a shaving tool is applied against a rod or bar which reduces cross sectional area along the entire surface thereof.

Certain problems would appear to arise if the shaving technique exemplified by Shaw et al. were to be directly applied to the manufacture of multiple gauge products from rectangular strip stock. Specifically, the application of shaving force against only a portion of the total surface of the strip tends to magnify some of the problems set forth in the aforenoted patent, particularly, the inability to hold the workpiece properly centered with respect to the tool, with the result that the workpiece wanders and a wavy or broken surface may result. A further difficulty which is believed to be magnified by the removal of stock from only a portion of workpiece surface relates to the excessive chattering and longitudinal vibration that takes place as the strip passes through the tool, which appears on the finished product as a galled or torn surface. Finally, the uneven application of frictional stress to the workpiece can result in unwanted product unevenness or camber, which would require subsequent processes to eliminate.

SUMMARY OF THE INVENTION

In accordance with this invention, it has been found that a shaving operation for the production of multiple gauge metal strip products may be conducted which comprises drawing a metal strip of essentially rectangular initial cross sectional configuration, while maintaining said strip under positive back tension, across a cutting tool disposed at a predetermined angle with respect to the longitudinal direction of the strip, whereby the extent of surface reduction of the strip is confined to an area comprising from about 5 to about 50 percent of total surface area, and the volume removal of strip material ranges from about 10 to about 60 percent measured in relation to initial strip cross sectional area. The method of this invention may be practiced as both a multi-pass and single-pass procedure.

Further features of this invention comprise the provision of an adjustable shaving apparatus comprising a shaving tool holder including horizontal and vertical adjustment means, which supports a shaving tool possessing a cutting surface defining the desired multiple gauge configuration. The shaving tool cutting edge is disposed at a critical rake angle defined by the leading vertical edge of the tool and a vertical plane extending in perpendicular relation to the longitudinal direction of the strip. The rake angle may vary from 2½° to about 25°, and preferably from 5° to about 18°. The apparatus of the present invention rests upon a generally horizontal support surface and is provided with laterally disposed strip support guides which prevent unwanted movement of the strip during the shaving operation.

The method of this invention possesses certain advantages over conventional milling procedures, in that scrap retrieval is made easier and higher speeds of operation are possible. Scrap retrieval is made easier, as the removed stock is usually obtained in the form of a long continuous coil, whereas the scrap generated by conventional cutting processes is obtained in random shapes and sizes which are bothersome to gather and contain. Likewise, shaving to a specified gauge can be achieved with greater ease than with conventional milling procedures, and with fewer passes and in less time than with conventional rolling techniques.

It is, accordingly, a principal object of the present invention to provide an improved method for the manufacture of multiple gauge metal strip products which employs a shaving operation.

It is another object of the present invention to provide a method as aforesaid which may be practiced with a single pass reduction procedure.

It is a further object of the present invention to provide an apparatus for the performance of the shaving method as aforesaid which is of simple construction and which prevents aberrant strip movement during the performance of said method.

Other objects and advantages will become apparent to those skilled in the art from a consideration of the description which proceeds with reference to the following drawings.

DETAILED DESCRIPTION

In accordance with the present invention, the foregoing objects and advantages are readily attained.

The method of this invention comprises drawing a strip of generally rectangular cross section which is maintained under back tension through a shaving apparatus whereby a shaving tool defining a cutting edge possessing regions of two or more variable levels of depth located therein engages the surface of said strip so as to continually inscribe the corresponding pattern thereon. The shaving method of this invention may be conducted continuously to achieve strip surface reductions confined to an area comprising from about 5 to about 50 percent of total surface area, and preferably from about 10 to about 40 percent of total surface area, and strip volume removal ranging from about 10 to about 60 percent, and preferably from about 15 to about 50 percent, said volume removal measured in relation to the measured change in strip cross sectional area. The foregoing may be achieved in one shaving pass, and products produced thereby will possess favorably uniform shaved surfaces.

The shaving apparatus employed in accordance with the present invention comprises an adjustable shaving tool provided with a cutting edge defining a pattern corresponding to the multiple gauge surface desired in the final strip product. The shaving tool is primarily adjustable in two respects to enable shaving to be conducted to successfully achieve maximum possible strip reductions measured primarily in terms of volume removal. As noted in our earlier co-pending parent application, maximum volume removal per shaving pass may be generally determined in relation to the yield strength of the strip and then coordinated with the cross sectional configuration of the desired end product. This being done, the apparatus is then appropriately adjusted to achieve the extent of volume removal desired. The apparatus will be described in greater detail hereinbelow.

Figure 1:
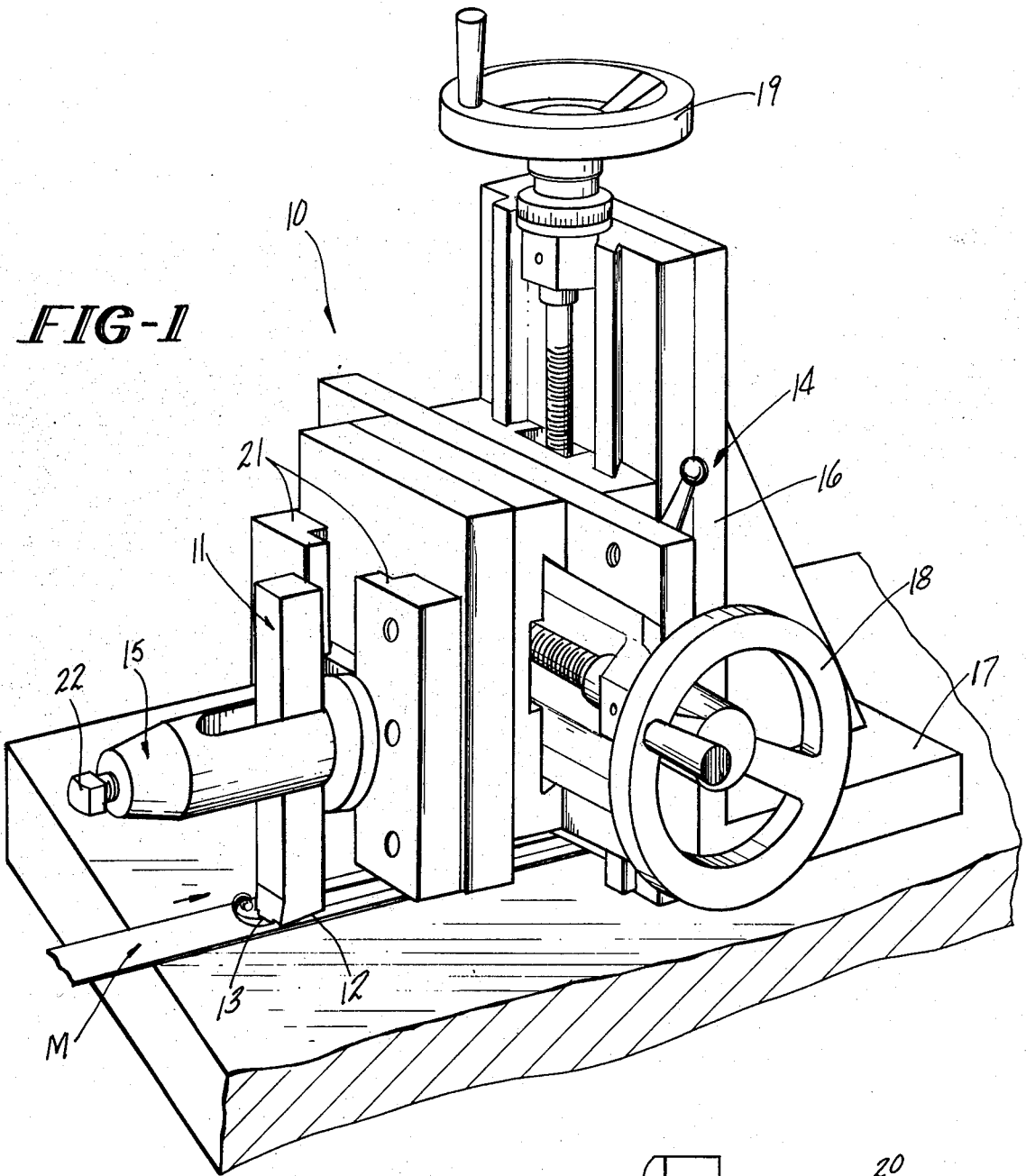
FIG. 1 is a perspective view of a shaving apparatus employed in accordance with the invention.

Referring to FIG. 1, a shaving apparatus useful in accordance with the present invention is illustrated in perspective. Apparatus 10 comprises a bar-shaped shaving tool 11, which is positioned in the Figure with cutting edge 12 located adjacent and on top of respective metal strip M. As noted above, cutting edge 12 defines a cutting pattern 13 whose configuration serves as the template for the final configuration of the multiple gauge strip product. As will be seen in greater detail in FIG. 2, cutting edge 12 is disposed at a critical angle with respect to strip M which facilitates the continuous operation of the method of this invention.

Referring further to FIG. 1, shaving tool 11 is supported by adjustable tool holder 14 comprising tool support structure 15 held within adjustable housing 16. Housing 16 is fastened to a flat supporting surface through base 17, which is provided with a tunnel-like channel for the passage therethrough of strip M. Housing 16 is provided with a horizontal adjustment 18 and a vertical adjustment 19 comprising, respectively, calibrated screw-driven slide connections. Adjustments 18 and 19 are fine adjustments provided in addition to a gross adjustment which comprises slidable tool support structure 15 located within tracks 21. Thus, when the appropriate vertical position is determined in gross, support structure 15 is held stationary and fixed in position by tightening screw threaded nut 22 against shaving tool 11, whereby the back plate of support structure 15, not shown, is brought into firm engagement with tracks 21. Thereafter, fine adjustments of both vertical and horizontal position can be made with adjustments 18 and 19 noted earlier.

Figure 2:
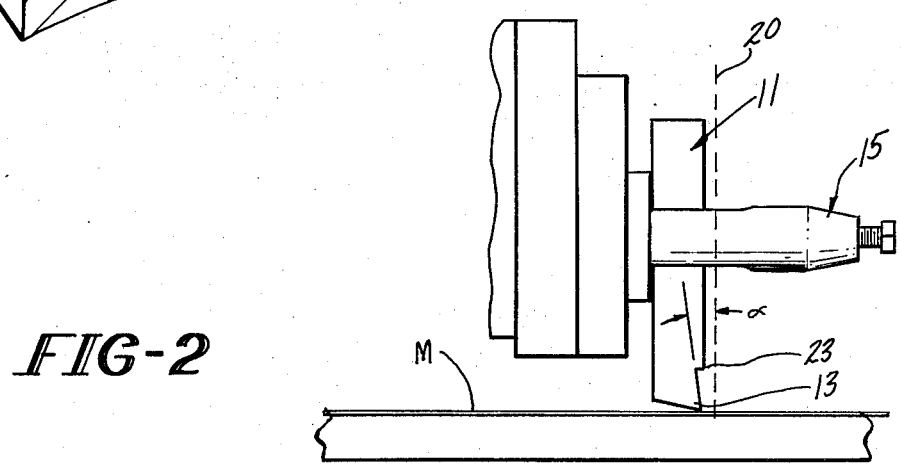
FIG. 2 is a side view of the shaving apparatus shown in FIG. 1.

As stated above, adjustments of depth of cut or maximum stock removal are determined with respect to the yield strength of the strip and the particular configuration desired. In addition to the aforenoted adjustments of vertical and horizontal position of the shaving tool, a further critical adjustment is made which relates to the rake angle of the tool edge. The rake angle may be defined as the angle which the plane of the vertical leading surface cutting tool or blade defines with respect to an imaginary vertical plane perpendicular to the direction of strip travel. Referring to FIG. 2, tool 11 is shown in greater detail wherein an angle $\alpha$ is defined which is measured from plane 20, shown in phantom which is perpendicular to the direction of strip M, and the inclined surface 23 employed at the lower portion of tool 11 closest to strip M. In accordance with the present invention, it has been found that a certain critical rake angle exists, which exceeded, results in a loss of control of the thickness of the finished strip product. Often, a rake angle in excess of the critical value causes the workpiece to ride up the tool, with the result that excessive strip material is removed. The rake angle found to be useful in the present method may range from about 2½° to about 25°, and preferably from about 5° to about 18°. Accordingly, and as illustrated in FIG. 2, tool 11 is constructed such that the desired shape including the rake angle is machined into the tool tip or cutting edge 12. The vertical leading face of the tool integral with cutting edge 12 is thus inclined at an angle lying within the range of rake angles noted above.

After the appropriate adjustments of shaving tool 11 have been made, shaving of strip M is accomplished by pulling the strip across cutting edge 12 with the necessary force to overcome the shaving resistance at the tool. As noted earlier, strip M is supported and guided in part by the flat surface supporting tool holder 14. In addition, further supports or guides, not shown, could be employed in lateral relation to the edges of strip M to prevent lateral wandering from occurring during the shaving operation.

As stated before, the method of this invention may be practiced as a multi-pass or single-pass operation. Thus, when the amount of stock removal desired exceeds the maximum possible stock removal per pass, the desired amount may be divided so that lesser amounts are conducted in two or more passes. In this way, the yield strength of the strip will not be exceeded and strip rupture is prevented.

Though the foregoing description has proceeded with reference to a particular shaving apparatus, the present invention should not be so limited, as variations in apparatus are contemplated within the scope of the present method. Thus, the shaving tool support structure could assume a different shape and size and could employ adjustment means varying in both number and size. Likewise, the shaving tool may comprise a plurality of cutting edges placed in side-by-side or sequential relation to each other.

Figure 3:
FIGS. 3, 4 and 5 are schematic cross sectional views of multiple gauge strip configurations prepared in accordance with the invention.
Figure 4:
Figure 5:
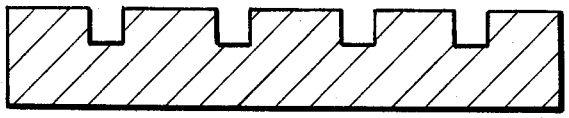

In order to gain a fuller understanding of the method of this invention and to illustrate the underlying principals thereof, the following examples are presented which were conducted to prepare multiple gauge products resembling, respectively, the configurations set forth in FIGS. 3, 4 and 5.

The following examples are presented for purposes of illustration only and should not be construed as limitative of the invention.

EXAMPLE I

Samples of C.D.A. Alloy 260 in both soft and extra hard tempers were shaved to prepare a product possessing the configuration shown in FIG. 3. An apparatus was employed which comprised a shaving tool in accordance with the invention and a strip guide together with coiler and recoiler reels to pay off and wind up the strip. The pay off reel was controlled so as to exert a back tension on the strip entering the shaving apparatus. Successively larger cuts were taken until yielding occurred, and the volume of removal was measured at that point. The alloy samples comprised flat ribbons of strip measuring 1.203 × 0.096 inch. The configuration of FIG. 3 possesses a surface removal of approximately 29 percent and a volume removal of 26.5 percent. The slanted edge defining the trough is inclined at a 45° angle, and total depth of cut is 0.042 inch. The results of the experiment are set forth in Table I, below. Variations in maximum cut depth and, therefore, volume removal between samples A and B is attributible to the difference in the yeild strengths of the respective samples.

TABLE I

CONTINUOUS SHAVING RUN RESULTS

| | Alloy | 0.2% Yield Strength ksi | Total Max. Cut Depth in. Per Pass | Max. Volume Removal, % Per Pass | No. of Passes | Vol. Removed % Per Pass |
|---|---|---|---|---|---|---|
| A | 260 | 15 | 0.004 | 2.5 | 14 Passes | 1.9 |
| B | 260 | 76 | 0.027–0.035* | 17–22.1 | 2 Passes | 13.3 |

*Strip broke at cut depth of 0.035" but shaved acceptably at a cut depth of 0.027".

EXAMPLE II

A multiple gauge strip part was desired with a configuration consisting of three truncated pyramidal protrusions in the central region of one major face thereof. The cross sectional configuration of the product is shown in FIG. 4. The product was prepared by the method of the invention as follows:

A flat rectangular strip of Alloy 260 having a width of 0.620 inch and a thickness of 0.092 inch as well as reasonable camber tolerances was provided. A formed tool consisting of the negative of the strip configuration required was prepared wherein appropriate relief and cutting angles were included. The strip was draw-shaved after the tool had penetrated the strip to the required depth. The moving strip was shaved to the desired configuration in two passes, each of which achieved an 18 percent reduction of the metal volume so that the total volume removal was close to 36 percent. The final strip thickness at its minima was 0.040 inch, while its maxima, comprising the height of the protrusions, remained at 0.092 inch. The surface removal was approximately 45 percent of total strip surface. As the protrusions were desired on one face alone, surface removal for this shape was confined to the top broad face of the strip.

EXAMPLE III

A further configuration was prepared as illustrated in FIG. 5 which consisted of a flat strip 1 inch wide, 0.080 inch thick with four 1/16 inch rectangular grooves 0.030 inch deep in which about 12 percent of the surface area has been removed. The draw-shaving process described in Example I was employed, however shaving was limited to one pass. The total volume removed in this test was about 9 percent.

EXAMPLE IV

A strip product possessing a configuration similar to that of Example II was prepared employing the same apparatus, with the difference being that Alloy 638, a copper-aluminum-silicon-cobalt alloy was employed as the starting material. Rather than using two passes, one pass was employed to prepare the product which developed a drawing force equivalent to the yield strength of the alloy. The foregoing technique resulted in a single pass reduction of 38 percent.

Shaving speeds in the continuous experiments were in the range of 50–200 ft/min., but speed control was not maintained. The shaved surface of the strip had a good appearance and thickness variations were measured to be ± 0.002 inch, while width variations were 0.005 inch.

This invention may be embodied in other forms or carried out in other ways without departing from the spirit or essential characteristics thereof. The present embodiment is therefore to be considered as in all respects illustrative and not restrictive, the scope of the invention being indicated by the appended claims and all changes which come within the meaning and range of equivalency are intended to be embraced therein.

What is claimed is:

1. A method for the production of a multiple gauge metal strip product of rectangular cross section possessing regions of two or more variable thicknesses providing a generally stepped surface configuration, said method comprising determining the maximum possible stock removal per shaving pass in relation to the yield strength of said strip by measuring the amount of said stock removed up to the point where yielding of said strip occurs under tension, adjusting an apparatus for shaving said strip to remove approximately the maximum possible stock in a single shaving pass without causing said metal strip to exceed its yield strength, drawing said strip while under back tension through the apparatus and shaving the strip whereby the surface thereof is reduced by an amount confined to an area comprising from approximately 5 to about 50 percent of total surface area, and the volume of strip material removed ranges from approximately 10 to about 60 percent as measured in relation to initial strip cross-sectional area.

2. The method of claim 1 wherein said surface reduction ranges from 10 to 40 percent and said volume removal ranges from about 15 to 50 percent.

3. The method of claim 1 wherein said adjusting the apparatus comprises the adjustment of the cutting depth of a shaving tool, and the selection of the desired rake angle of said shaving tool.

4. The method of claim 3 wherein said rake angle ranges from about 2½° to about 25° determined with respect to the vertical plane.

5. The method of claim 4 wherein said rake angle ranges from about 5° to about 18°.

6. The method of claim 3 wherein said adjusting the apparatus further comprises the fine adjustment of both the horizontal and the vertical dimensions of the position of said shaving tool in relation to the incoming strip.

7. The method of claim 1 wherein the desired configuration of said metal strip product is accomplished in one shaving pass.

8. The method of claim 1 wherein the desired configuration of said metal strip product is accomplished in more than one shaving pass.

9. The method of claim 1 wherein said strip is shaved to possess a configuration comprising three truncated pyramidal protrusions in the central region of one major face thereof.

10. The method of claim 1 wherein said strip is shaved to possess a configuration wherein four rectangular grooves are located in the central region of one major face thereof and 12 percent of said surface area has been removed.

11. A method for the production of a multiple gauge metal strip product of rectangular cross section possessing regions of two or more variable thicknesses provided with a generally stepped surface configuration, said method comprising determining the maximum possible stock removal per shaving pass in relation to the yield strength of said strip by measuring the amount of said stock removed up to the point where yielding of said strip occurs under tension, adjusting an apparatus for shaving said strip to remove approximately the maximum possible stock in a single shaving pass without causing said metal strip to exceed its yield strength, said adjusting the apparatus comprises the adjustment of the cutting depth of a shaving tool and the selection of the desired rake angle of said shaving tool; wherein said rake angle selected ranges from approximately 2½° to about 25° with respect to a vertical plane, and drawing said strip while under back tension through the apparatus and shaving the strip whereby the surface thereof is reduced by an amount confined to an area comprising from approximately 5 to about 50 percent of the total surface area, and the volume of strip material removed ranges from approximately 10 to about 60 percent as measured in relation to initial strip cross-sectional area.

12. A method of claim 11 wherein the desired configuration of said metal strip product is accomplished in one shaving pass.

13. The method of claim 11 wherein the desired configuration of said metal strip product is accomplished in more than one shaving pass.

* * * * *